United States Patent
Chen et al.

(10) Patent No.: US 10,725,808 B2
(45) Date of Patent: Jul. 28, 2020

(54) VIRTUAL MACHINE IMAGE CONVERSION

(71) Applicant: International Business Machines Corporation, Armonk, NY (US)

(72) Inventors: Li Long Chen, Beijing (CN); Lan Luo, Beijing (CN); Yuan Bin Teng, Beijing (CN); Wen Rui Zhao, Beijing (CN)

(73) Assignee: International Business Machines Corporation, Armonk, NY (US)

(*) Notice: Subject to any disclaimer, the term of this patent is extended or adjusted under 35 U.S.C. 154(b) by 145 days.

(21) Appl. No.: 15/397,979

(22) Filed: Jan. 4, 2017

(65) Prior Publication Data

US 2018/0189089 A1 Jul. 5, 2018

(51) Int. Cl.
*G06F 9/455* (2018.01)
*G06F 16/188* (2019.01)
*G06F 8/61* (2018.01)

(52) U.S. Cl.
CPC ............ *G06F 9/45558* (2013.01); *G06F 8/63* (2013.01); *G06F 16/188* (2019.01); *G06F 2009/45583* (2013.01)

(58) Field of Classification Search
None
See application file for complete search history.

(56) References Cited

U.S. PATENT DOCUMENTS

| | | | |
|---|---|---|---|
| 2010/0293537 A1* | 11/2010 | Broussard | G06F 9/44505 717/170 |
| 2011/0302580 A1* | 12/2011 | Iikura | G06F 8/63 718/1 |
| 2012/0173866 A1 | 7/2012 | Ashok et al. | |
| 2014/0053150 A1* | 2/2014 | Barnett | G06F 9/455 718/1 |
| 2016/0191623 A1 | 6/2016 | Vasudevan et al. | |
| 2016/0359955 A1* | 12/2016 | Gill | H04L 67/1097 |
| 2017/0180346 A1* | 6/2017 | Suarez | G06F 9/45558 |

OTHER PUBLICATIONS

Stephane Graber, "Booting an Ubuntu 12.04 virtual machine in an LXC container", https://www.stgraber.org/2012/03/04/booting-an-ubuntu-12-04-virtual-m . . . , Mar. 4, 2012, 9 pages.
Stack Overflow, "Convert Vagrant box to docker image", http://stackoverflow.com/questions/31321076/convert-vagrant-box-to-do . . . , Printed Oct. 21, 2016, 2 pages.
LXC : Install and configure the Linux Containers, http://wiki.deimos.fr/LXC_:_Install_and_configure_the_Linux_Containe . . . , Printed Oct. 21, 2016, 38 pages.

\* cited by examiner

*Primary Examiner* — Duy Khuong T Nguyen
*Assistant Examiner* — Melissa A Headly
(74) *Attorney, Agent, or Firm* — Nicholas D. Bowman; Hunter E. Webb; Keohane & D'Alessandro PLLC (57) ABSTRACT

Example embodiments of the present disclosure provide methods, devices, and computer programs for virtual machine image conversion. A delta file system between a file system of a first virtual machine (VM) image and a file system of a first operating system (OS) base image is determined. A file system of a first container base image may be obtained according to the first OS base image. Then, the delta file system may be applied to the file system of the first container base image to create a container image.

16 Claims, 5 Drawing Sheets

VIRTUAL MACHINE IMAGE CONVERSION

TECHNICAL FIELD

In general, embodiments of the present invention relate to computer-based virtualization. Specifically, embodiments of the present invention relate to an approach for converting a virtual machine (VM) image to a container image in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

With developments of computing technologies, container based virtualization is being used widely in a cloud environment or other computing environments. Abstraction of a container image may be achieved on an operating system (OS), in contrast to the abstraction of a virtual machine (VM) image, which is usually achieved with an entire hardware stack that includes the OS. In comparison to the abstraction of the VM image, the abstraction of the container image utilizes relatively few resources and can allow a user to pack and run a greater number of applications on a single server. However, there are many workloads that are currently running on VM images. To date, it has been difficult to convert these current VM images to container images, especially when the number of VM images to be converted is very large. As such, a solution for effectively converting VM images to container images is not currently available.

SUMMARY OF THE INVENTION

Example embodiments of the present disclosure provide methods, computing systems, and computer programs for virtual machine image conversion. In an embodiment, a delta file system between a file system of a first virtual machine (VM) image and a file system of a first operating system (OS) base image is determined. A file system of a first container base image may be obtained according to the first OS base image. Then, the delta file system may be applied to the file system of the first container base image to create a container image.

In a first aspect, a computer-implemented method is provided. In the method, a delta file system between a file system of a first virtual machine (VM) image and a file system of a first operating system (OS) base image is determined; a file system of a first container base image is obtained according to the first OS base image; and the delta file system may be applied to the file system of the first container base image to create a container image. This method offers several advantages, such as, but not limited to, providing a way to convert a VM image into a more efficiently executed container image (e.g., that runs a service which was previously run on the VM image) in a quick, automatic, and effective manner.

The method may optionally further comprise converting the file system of the first OS base image to obtain the file system of the first container base image. These techniques enable, for example, the ability to create a base container image from a converted VM OS base image.

The method may optionally further comprise obtaining the file system of the first container base image according to a file system of a second container base image matching the first OS base image. The file system of the second container base image may be obtained by converting a file system of a second OS base image of a second VM image. These techniques enable, for example, the ability to utilize a container base image that is currently being used as a base image for other containers, including, but not limited to a container base image that has been previously converted from a different VM image.

The method may optionally further comprise embodiments in which the delta file system comprises one or more of the following updates to the file system of the first OS base image: file updates, directory updates, file authority updates, and directory authority updates. These techniques enable, for example, the ability to convert VM images having a variety of different updates.

In a second aspect, a computing system is proposed. The computing system comprises a computer processor coupled to a computer-readable memory unit, the memory unit comprising instructions that when executed by the computer processor implements a method. In the method, a delta file system between a file system of a first virtual machine (VM) image and a file system of a first operating system (OS) base image is determined; a file system of a first container base image may be obtained according to the first OS base image; and the delta file system may be applied to the file system of the first container base image to create a container image.

In a third aspect, a computer program product is proposed. The computer program product is tangibly stored on a non-transient machine readable medium and comprising executable instructions which, when executed on an device, cause the device to: determining a delta file system between a file system of a first virtual machine (VM) image and a file system of a first operating system (OS) base image; obtaining a file system of a first container base image according to the first OS base image; and applying the delta file system to the file system of the first container base image to create a container image.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar elements.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
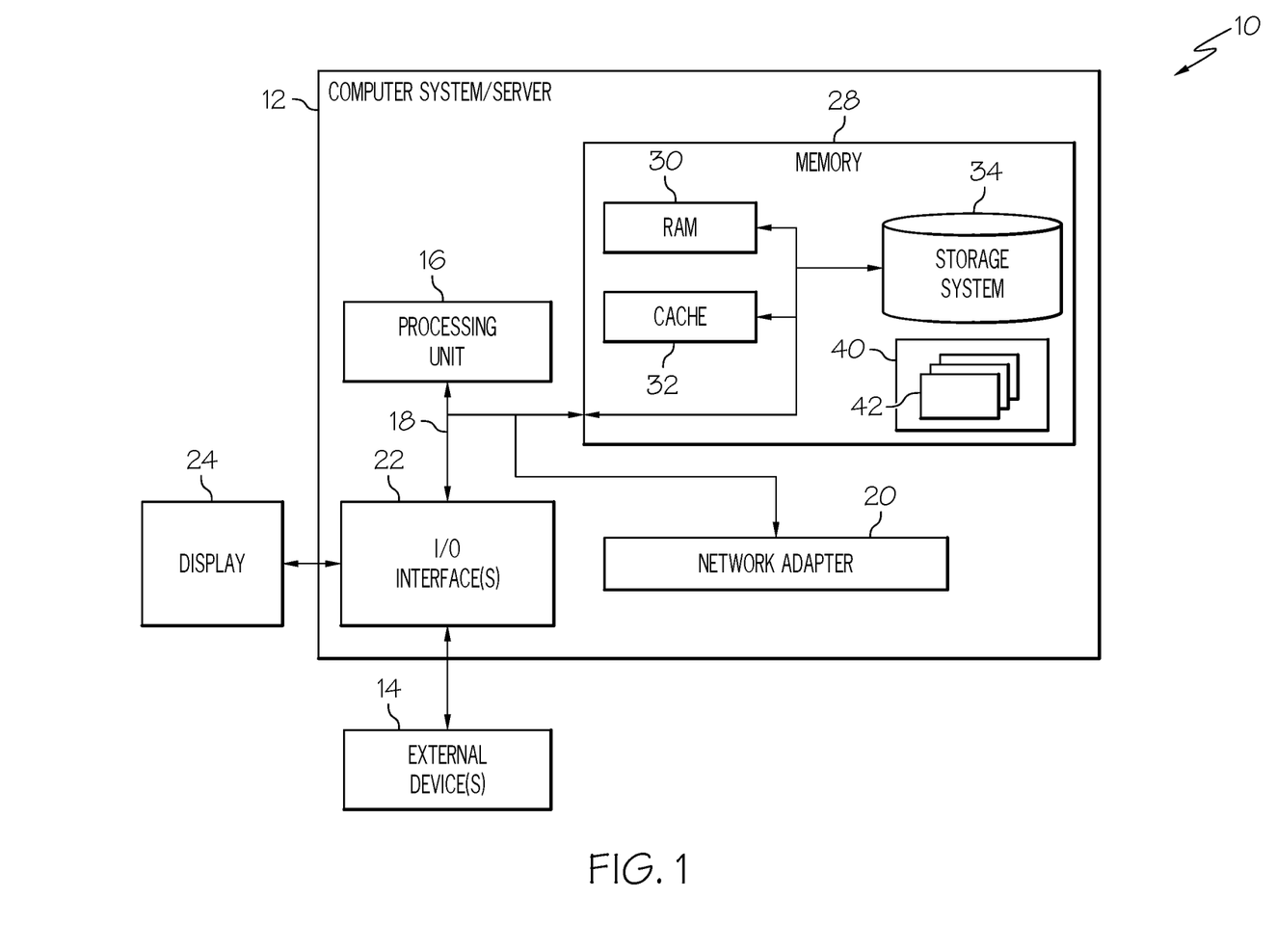
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
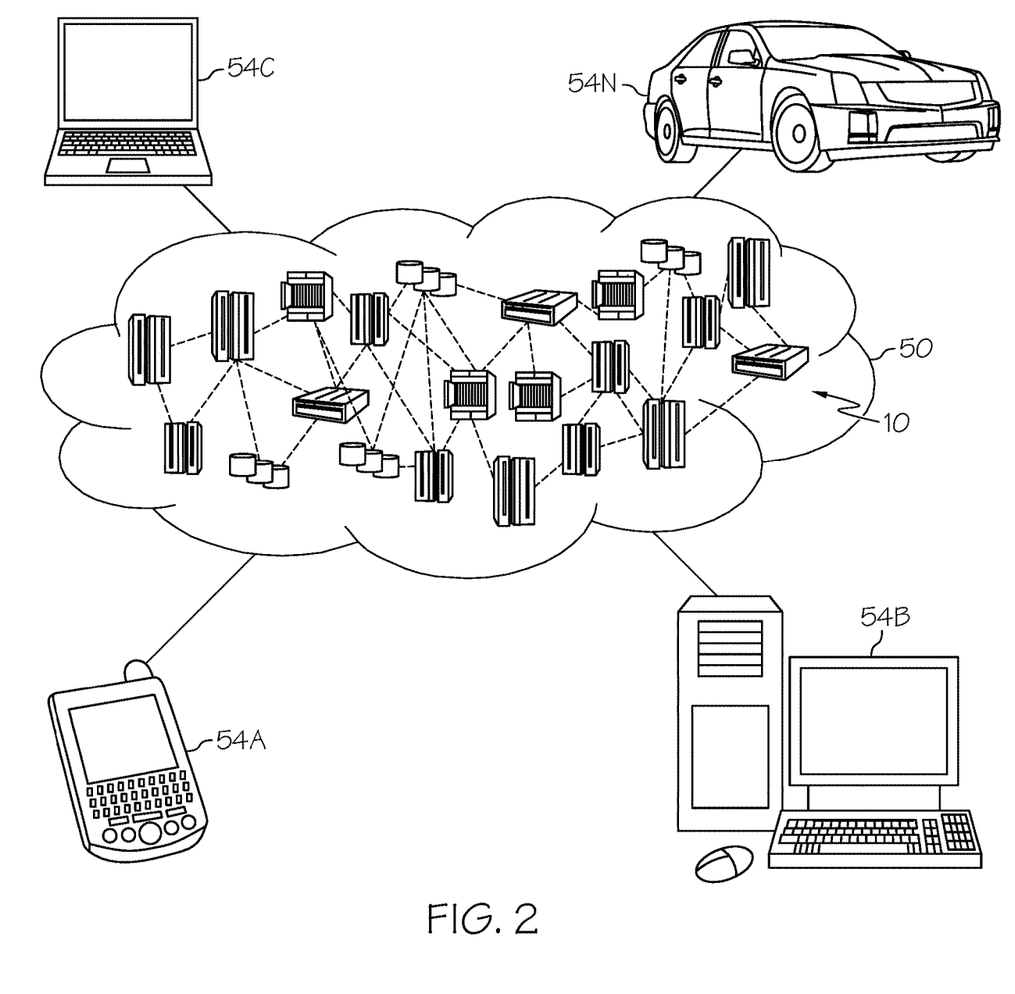
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
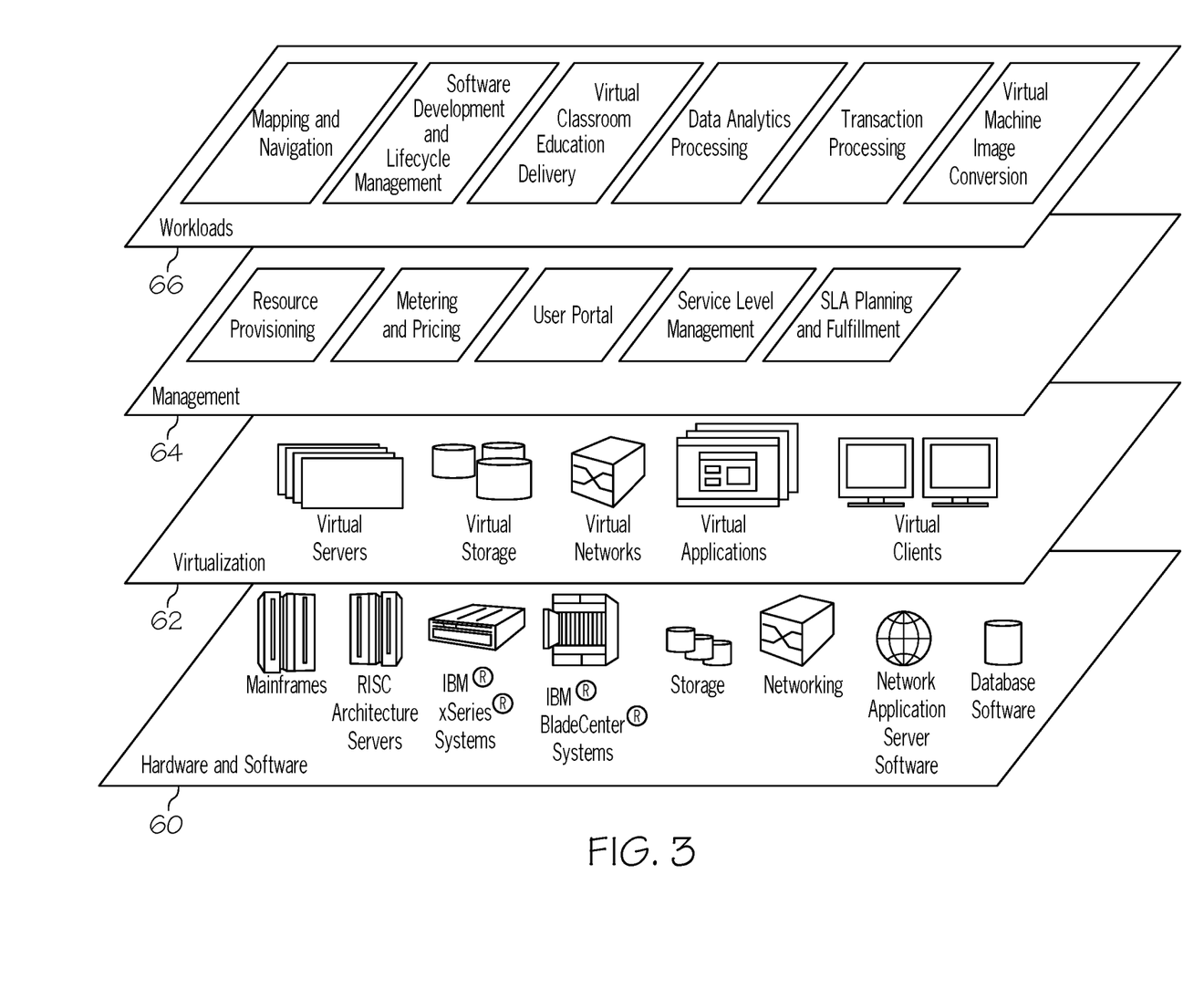
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; servers; blade servers; storage devices; and networks and networking components. In some embodiments, software components include network application server software and database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and virtual machine image conversion.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

With developments of computing technologies, container based virtualization is being used widely in a cloud environment or other computing environments. Abstraction of a container image may be achieved on an operating system (OS), in contrast to the abstraction of a virtual machine (VM) image, which is usually achieved with an entire hardware stack that includes the OS. In comparison to the abstraction of the VM image, the abstraction of the container image utilizes relatively few resources and can allow a user to pack and run a greater number of applications on a single server. However, there are many workloads that are currently running on VM images. To date, it has been difficult to convert these current VM images to container images, especially when the number of VM images to be converted is very large. As such, a solution for effectively converting VM images to container images is not currently available.

According to embodiments of the present disclosure, methods, computing systems, and computer programs for virtual machine image conversion are provided. With these embodiments, VM images may be converted to container images. Workloads (services), which are previously run on the VM images, now may be run on the container images.

In the embodiments of the present disclosure, physical servers, physical storage, and physical network, etc. may be virtualized to support one or more virtual machines. A VM image may comprise an abstraction of physical hardware resources. Multiple VM images may share same hardware resources, and each of the multiple VM images has its own virtual CPU, virtual memory, virtual disk, and virtual network interface, etc. Each of the multiple VM images builds its operating system (OS), applications, and file system on those virtualized hardware resources.

An operating system (OS) may be running on physical/virtual servers, physical/virtual storage, and physical/virtual network, etc. In an example, a container image may comprise an abstraction of an operating system. Multiple container images may share same operating system, and each of the container images has its own namespace, applications, and file system.

According to embodiments of the present disclosure, a file system of a VM image may comprise a file system of an operating system (OS) base image of the VM image and a delta file system. The OS base image of the VM image may be a clean operating system on which no additional application and/or service is built. The file system of the OS base image may comprise file systems which may be used for supporting or running the clean operating system. The OS base image of the VM image may be any type of operating system now known or to be developed. For example, the OS base image of the VM image may be Linux®, UNIX®, etc. In an example, the file system of the OS base image may comprise different aspects of the clean operating system, for example, files, directories, file authority, and directory authority, etc.

The delta file system may define the difference between the file system of the VM image and the file system of the OS base image. In an example, the delta file system may comprise updates to the file system of the OS base image. The updates to the file system of the OS base image are resulted by the building of additional applications or services on the OS base image. In an example, the updates to the file system of the OS base image may comprise one or more of the following: file updates, directory updates, file authority updates, and directory authority updates.

Figure 4:
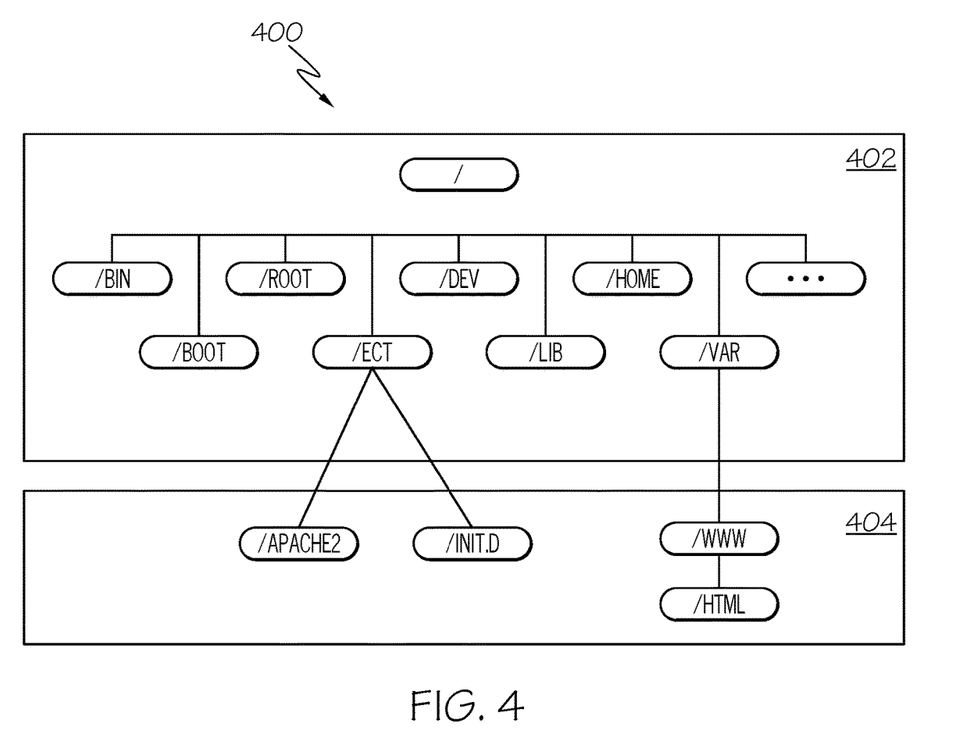
FIG. 4 schematically depicts a block diagram 400 of an example file system of a VM image according to an embodiment of the present invention.

FIG. 4 schematically illustrates a block diagram 400 of a file system 400 of a VM image according to an embodiment of the present disclosure.

In this example, the VM image may comprise an Apache Web server built on a Linux® OS base image. In an example, the file system 400 of the VM image may be defined using any type of file system standards in which updates to the file system of OS base image can be determined. For example, the file system 400 may be defined using EXT4 (the Fourth Extended File System), EXT3 (the Third Extended File System), etc. It should be understood that the discussion of specific operating system(s), middleware, application(s), file system(s), etc., in this example are included only for the sake of illustration and should not be understood as limiting.

The file system 400 of the VM image may comprise a file system 402 of an OS base image and a delta file system 404. The OS base image may comprise a clean Linux® system on which no additional application or service (for example, applications and/or services for Apache Web server) is built. The file system 402 may comprise file systems used for supporting the clean Linux® system. The file system 402 of the OS base image may comprise different file aspects of the clean Linux® system, for example, files, directories, file authority, and directory authority, etc. In an example, the file system 402 may comprise directories and files used for supporting the Linux® system. For example, the directories may comprise "/bin", "/boot", "/root", "/etc", "/dev", "/lib", "/home", "/var", etc.

The file system 400 of the VM image may also comprise updates to the file system 402 resulted by the building of the Apache Web server on the clean Linux® OS base image. For example, a directory named "/etc/apache2", a directory named "/etc/init.d", and a directory named "/var/www/html" may be added to the file system of the clean Linux® OS base image by the building of the Apache Web server. The delta file system 404 may comprise these directory updates (for example, "/etc/apache2", "/etc/init.d", "/var/www/html", etc.) to the file system 402. In a further example, the updates to file system 402 may comprise one or more of the following: file updates, directory updates, file authority updates, and directory authority updates.

Figure 5:
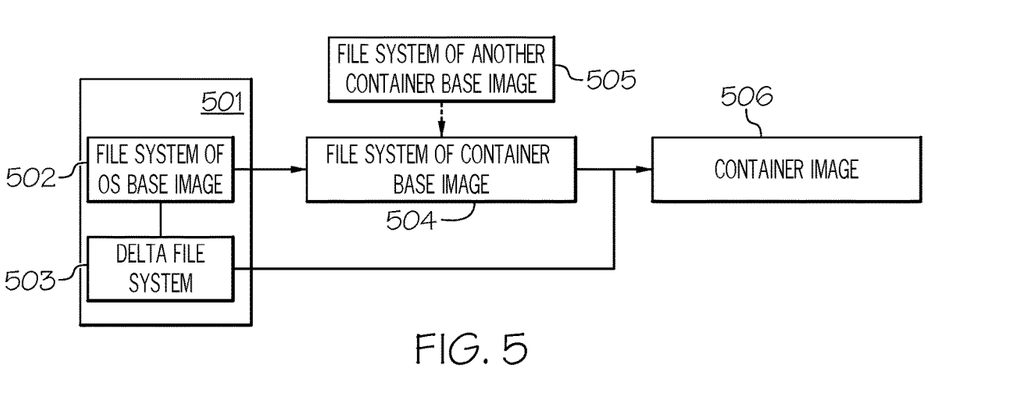
FIG. 5 schematically depicts a block diagram 500 of a general principle of VM image conversion according to an embodiment of the present invention.

FIG. 5 schematically illustrates a block diagram 500 of a general principle of virtual machine (VM) image conversion according to an embodiment of the present disclosure.

In this embodiment, a VM image is to be converted to a container image, and the VM image may comprise an operating system (OS) base image and applications and/or services built on the OS base image. Referencing to FIG. 5 now, a delta file system 503 between a file system 501 of the VM image and a file system 502 of the OS base image of the VM image may be determined.

According to an embodiment of the present disclosure, the delta file system 503 may define the difference between the file system 501 and the file system 502. Docker tools, such as "cmp", "diff" and "patch", etc., may be used to find out the difference between the file system 501 and the file system 502. According to another embodiment of the present disclosure, the delta file system 503 may comprise updates to the file system 502. These updates to the file system 502 may be determined and recorded on a storage device in parallel with or after the building of applications and/or services on the OS base image. The delta file system 503 comprising these updates may be obtained directly from the storage device if needed.

Other details and/or examples for creating delta file system 503 can be found in commonly owned application entitled "ATTACHING A PLUGGABLE AGENT TO A VIRTUAL MACHINE (VM) IN A NETWORKED COMPUTING ENVIRONMENT", having Attorney Docket No. END920160250US1 and U.S. patent application Ser. No. 15/392,882, and filed on Jan. 3, 2017, the entire contents of which is herein incorporated by reference.

A file system 504 of a container base image may be obtained according to the OS base image of the VM image. It is to be understood that sequences of these steps (determining the delta file system 503, and obtaining the file system 504, etc.) are optional. According to an embodiment of the present disclosure, obtaining the file system 504 may be implemented after determining the delta file system 503. According to other embodiments, obtaining the file system 504 may be implemented prior to or in parallel with determining the delta file system 503.

According to an embodiment of the present disclosure, obtaining the file system 504 according to the OS base image may comprises converting the file system 502 of the OS base image to obtain the file system of the container base image.

In an example, an automation script may be run to convert the file system 502 to obtain the file system 504. In a further example, a new VM image which only comprises the OS base image may be run, and an automation script to may be run to convert the whole file system of the new VM image to obtain the file system 504. In a further example, taking KVM (Kernel Virtual Machine) image as an example, ".img" file of the KVM image may be mounted to a directory, and then the whole directory may be converted to obtain a container base image.

According to an embodiment of the present disclosure, obtaining the file system 504 according to the OS base image may comprise obtaining the file system 504 according to a file system 505 of another container base image matching the OS base image.

In an example, another VM image may have been converted previously. The previously converted VM image may comprise another OS base image. File system of the other OS base image may have been converted, and the file system 505 may be obtained after the conversion and recorded on a storage device. In another example, the file system 505 may be obtained from a storage device which is used for storing file systems of OS base images. If the OS base image of the VM image to be converted matches the file system 505, the file system 505 may be copied to obtain the file system 504 or directly used as the file system 504.

In an example, the file system 505 corresponds to another OS base image of the previously converted VM image. If the OS base image of the VM image to be converted is the same as the another OS base image, the OS base image of the VM image to be converted may be thought as matching the file system 505. It is to be understood that "is the same as" may mean "is exactly same as", "is substantial same as" or "is similar to".

In a further example, an indicator may be assigned to the file system 505. The indicator may be used to define the OS base image which matches the file system 505. The indicator may also be kept on the storage device. In this example, an indicator may also be determined for the OS base image of the VM image to be converted. The indicator of the OS base image of the VM image to be converted may be compared with the indicator of the file system 505. If these two indicators match or meets a predetermined requirement, the OS base image of the VM image to be converted may be thought as matching the file system 505.

According to embodiments of the present disclosure, there would be no need to convert again the file system of the OS base image of the VM to be converted. As a result, the VM image conversion may be achieved relatively efficiently, and thus saving the system resource and decreasing time consumed in the conversion.

The delta file system 503 may be applied to the file system 504 of the container base image to create a container image 506. In an example, the applying the delta file system 503 to the file system 504 of the container base image may comprise mounting the updates comprised in the delta file system 503 to the file system 504.

According to an embodiment of the present disclosure, the delta file system 503 may be applied to the file system 504 of the container base image using any known or future technique. For example, Union Mount or Copy-on-Write techniques may be used to apply the delta file system 503 to the file system 504 of the base container image to create a container base image. In another example, Another Union File System (AUFS) or device mapper may be used to apply the delta file system 503 to the file system 504. In a further example, the delta file system 503 may comprise the updates to the file system 502, and the updates to the file system 502 may be mounted to the file system 504.

According to the embodiments, the created container image 506 may be used for running services which is previously run on the VM image. If the container image 506 is in place, a number of container instances may be started from this container image.

To this extent, certain embodiments of the present invention may offer various technical computing advantages. The embodiments of the present disclosure provide an efficient way to convert VM images to container images. The use of these container images rather than the VM images can improve the efficiency of the processes as well as that of the physical machines on which they are execution. Layered file system structures are provided and used in the VM image conversion. Both the file system of the VM image to be converted and the file system of the created container image may be layered file system structures. The file system of the VM image to be converted may be divided to a file system of an OS base image and a delta file system. The file system of the created container image may also be divided to a file system of a container base image and a delta file system. The VM image conversion can be performed relatively easily due to these layered file system structures, increasing the speed and precision at which existing VM images can be converted to more efficient container images. Further, if the OS base image of VM image to be converted matches a recorded file system of another container base image corresponding to an OS base image of a previously converted VM image, the need to repeat the conversion of file systems of OS base images of the VM image can be eliminated. Still further, in cases in which the VM images have the same OS base image, conversion of convert multiple VM images can be expedited. Moreover, the entire VM image conversion may be achieved automatically, without the need to manually adjust parameters to create a container.

Figure 6:
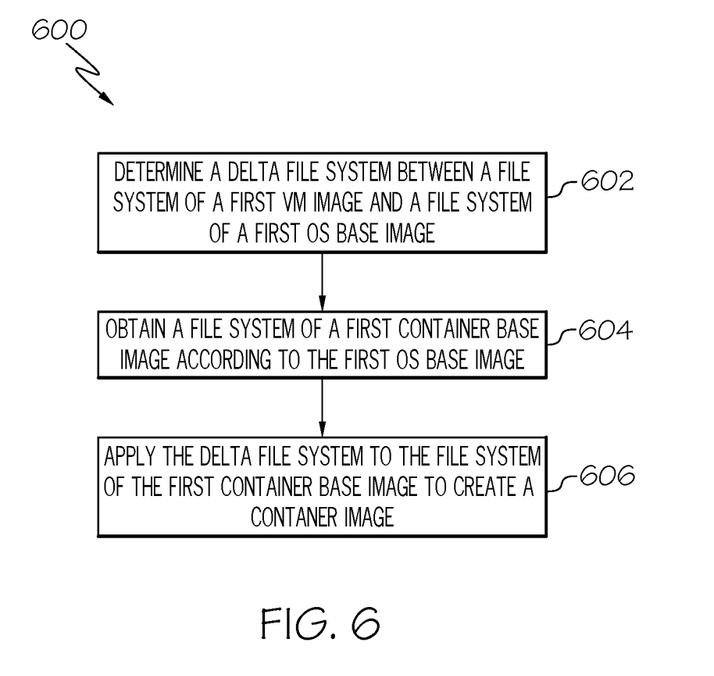
FIG. 6 is a flowchart of an example computer-implemented method 600 according to an embodiment of the present disclosure.

FIG. 6 is a flowchart of an example computer-implemented method 600 according to an embodiment of the present disclosure. The steps of method 600 may be carried out by one or more computer systems, and/or one or more physical or virtual devices in cloud computing environments or any other computing environments.

In step 602, a delta file system between a file system of a first VM image and a file system of a first OS base image can be determined. In step 604, a file system of a first container base image is obtained according to the first OS base image. In step 606, the delta file system is applied to the file system of the first container base image to create a container image.

According to embodiments of the present disclosure, sequences of steps (for example, step 602 and step 604) are optional. According to an embodiment of the present disclosure, step 604 may be implemented after step 602. According to other embodiments, step 604 may be implemented prior to or in parallel with step 602.

According to an embodiment of the present disclosure, the first VM image may comprise the first OS base image and applications or services built on the first OS base image. The delta file system may define the difference between the file system of the first VM image and the file system of the first OS base image. For example, the delta file system may comprise updates to the file system of the first OS base image. The determining the delta file system between the file system of the first VM image and the file systems of the first OS base image may comprise determining updates to the file system of the first OS base image. The delta file system comprises one or more of the following updates to the file system of the first OS base image: file updates, directory updates, file authority updates, and directory authority updates. According to an embodiment of the present disclosure, updates to the file system of the first OS base image may be recorded on a storage device in parallel with or after the building of applications and/or services on the first OS base image. Then, the delta file system may be directly obtained from the storage device.

According to an embodiment of the present disclosure, the obtaining the file system of the first container base image according to the first OS base image may comprises converting the file system of the first OS base image to obtain the file system of the first container base image. In an example, an automation script may be run to convert the file system of the first OS base image to obtain the file system of the first container base image. In a further example, a new VM image which only comprises the first OS base image may be run, and an automation script to may be run to convert the whole file system of the new VM image to obtain the file system of the first container base image. In a further example, taking KVM (Kernel Virtual Machine) image as an example, ".img" file of the KVM image may be mounted to a directory, and then the whole directory may be converted to obtain the file system of the first container base image.

According to an embodiment of the present disclosure, the obtaining the file system of the first container base image according to the first OS base image may comprises obtaining the file system of the first container base image according to a file system of a second container base image matching the first OS base image.

In an example, a second VM image may have been converted previously. The second VM image may comprise a second OS base image and/or applications/services. File system of the second OS base image may be converted to obtain the file system of the second container base image. The obtained file system of the second container base image may be recorded on any suitable storage device. In another example, the file system of the second container base image may be obtained from a storage device which is used for storing file systems of OS base images. If the first OS base image of the first VM image is found matching the file system of the second container base image, the file system of the second container base image may be copied to obtain or directly used as the file system of the first container base image.

In an example, the file system of the second container base image corresponds to second OS base image of the second VM image. If the first OS base image of the first VM image is the same as the second OS base image, the first OS base image may be thought as matching the file system of the second container base image. It is to be understood that "is the same as" may mean "is exactly same as", "is substantial same as" or "is similar to".

In a further example, an indicator may be assigned to the file system of the second container base image. The indicator may be used to define the OS base image which matches the file system of the second container base image. The indicator may also be kept on a storage device. In this example, an indicator may also be determined for the first OS base image. The indicator of the first OS base image can be compared with the indicator of the file system of the second container base image. If the indicator of the first OS base image matches the indicator of the file system of the second container base image, the first OS base image may be thought as matching the file system of the second container base image.

According to embodiments of the present disclosure, there would be no need to convert the file system of the first OS base image.

According to an embodiment of the present disclosure, wherein the created container image is used is used to run a service which is previously run on the first VM image. If the created container image is in place, a number of container instances can be started from this container image.

According to an embodiment of the present disclosure, a computing system is proposed. The computing system comprises a computer processor coupled to a computer-readable memory unit, the memory unit comprising instructions that when executed by the computer processor implements a method. In the method, a delta file system between a file system of a first virtual machine (VM) image and a file system of a first operating system (OS) base image is determined; a file system of a first container base image may be obtained according to the first OS base image; and then the delta file system may be applied to the file system of the first container base image to create a container image.

According to an embodiment of the present disclosure, a computer program product is proposed. The computer program product is tangibly stored on a non-transient machine-readable medium and comprising machine-executable instructions. The instructions, when executed on an electronic device, cause the electronic device to: determining a delta file system between a file system of a first virtual machine (VM) image and a file system of a first operating system (OS) base image; obtaining a file system of a first container base image according to the first OS base image; and applying the delta file system to the file system of the first container base image to create a container image.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    determining a delta file system based on a comparison that determines a difference between a file system of a first virtual machine (VM) image of an original non-container VM and a file system of a first operating system (OS) base image, the original non-container VM having an operating system and a set of applications/services, the resulting delta file system being a remainder of the file system of the first virtual machine image after files corresponding to the operating system has been removed;
    obtaining a file system of a first container base image according to the first OS base image; and
    converting the original non-container VM into a container image by applying the delta file system to the file system of the first container base image to create a container image that has a service running functionality of the original non-container VM;
    wherein the delta file system defines any differences between the original non-container VM and the first operating system (OS) base image and comprises one or more of the following updates to the file system of the first OS base image: file updates, directory updates, file authority updates, and directory authority updates.

2. The method of claim 1, the obtaining the file system of the first container base image according to the first OS base image comprises:
    converting the file system of the first OS base image to obtain the file system of the first container base image.

3. The method of claim 1, the obtaining the file system of the first container base image according to the first OS base image comprises:
    obtaining the file system of the first container base image according to a file system of a second container base image matching the first OS base image.

4. The method of claim 3, wherein the file system of the second container base image is obtained by converting a file system of a second OS base image of a second VM image.

5. The method of claim 1, wherein the created container image is used to run a service which is previously run on the first VM image.

6. A computing system comprising a computer processor coupled to a computer-readable memory unit, the memory unit comprising instructions that when executed by the computer processor implements a method comprising:
    determining a delta file system based on a comparison that determines a difference between a file system of a first virtual machine (VM) image of an original non-container VM and a file system of a first operating system (OS) base image, the original non-container VM having an operating system and a set of applications/services, the resulting delta file system being a remainder of the file system of the first virtual machine image after files corresponding to the operating system has been removed;
    obtaining a file system of a first container base image according to the first OS base image; and
    converting the original non-container VM into a container image by applying the delta file system to the file system of the first container base image to create a container image that has a service running functionality other original non-container VM;
    wherein the delta file system defines any differences between the original non-container VM and the first operating system (OS) base image and comprises one or more of the following updates to the file system of the first OS base image: file updates, directory updates, file authority updates, and directory authority updates.

7. The computing system of claim 6, the obtaining the file system other first container base image according to the first OS base image comprises:
    converting the file system other first OS base image to obtain the file system of the first container base image.

8. The computing system of claim 6, the obtaining the file system of the first container base image according to the first OS base image comprises:
    obtaining the file system of the first container base image according to a file system of a second container base image matching the first OS base image.

9. The computing system of claim 8, wherein the file system of the second container base image is obtained by converting a file system of a second OS base image of a second VM image.

10. The computing system of claim 6, wherein the created container image is used to run a service which is previously run on the first VM image.

11. A computer program product being tangibly stored on a non-transient machine-readable medium and comprising machine-executable instructions, the instructions, when executed on an electronic device, causing the electronic device to:
    determining a delta file system based on a comparison that determines a difference between a file system of a first virtual machine (VM) image of an original non-container VM and a file system of a first operating system (OS) base image, the original non-container VM having an operating system and a set of applications/services, the resulting delta file system being a remainder of the file system of the first virtual machine image after files corresponding to the operating system has been removed;
    obtaining a file system of a first container base image according to the first OS base image; and
    converting the original non-container VM into a container image by applying the delta file system to the file system of the first container base image to create a container image that has a service running functionality of the original non-container VM;
    wherein the delta file system defines any differences between the original non-container VM and the first operating system (OS) base image and comprises one or more of the following updates to the file system of the first OS base image: file updates, directory updates, file authority updates, and directory authority updates.

12. The computer program product of claim 11, the obtaining the file system of the first container base image according to the first OS base image comprises:
- converting the file system of the first OS base image to obtain the file system of the first container base image.

13. The computer program product of claim 11, the obtaining the file system of the first container base image according to the first OS base image comprises:
- obtaining the file system of the first container base image according to a file system of a second container base image matching the first OS base image.

14. The computer program product of claim 13, wherein the file system of the second container base image is obtained by converting a file system of a second OS base image of a second VM image.

15. The computer program product of claim 11, wherein the created container image is used to run a service which is previously run on the first VM image.

16. The method of claim 1, the determining the delta file system further comprising:
- union mounting an empty file system to an image of the base operating system;
- comparing the file system of the first VM image of the original non-container VM with the file system of the base operating system; and
- saving any differences between the VM image and the base operating into a new file system union mounted to get the delta file system that contains only the differences.

* * * * *